April 28, 1925. 1,535,517
C. ANDREINI
WINDMILL
Filed May 24, 1923 3 Sheets-Sheet 3
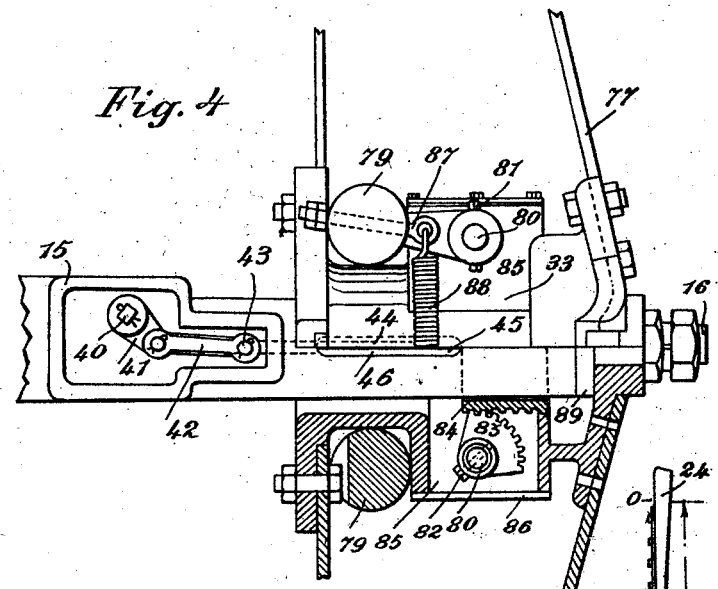
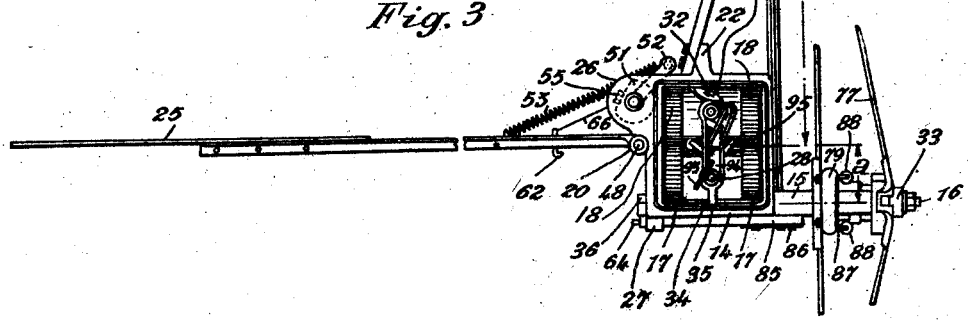
Inventor
Corrado Andreini Patented Apr. 28, 1925.

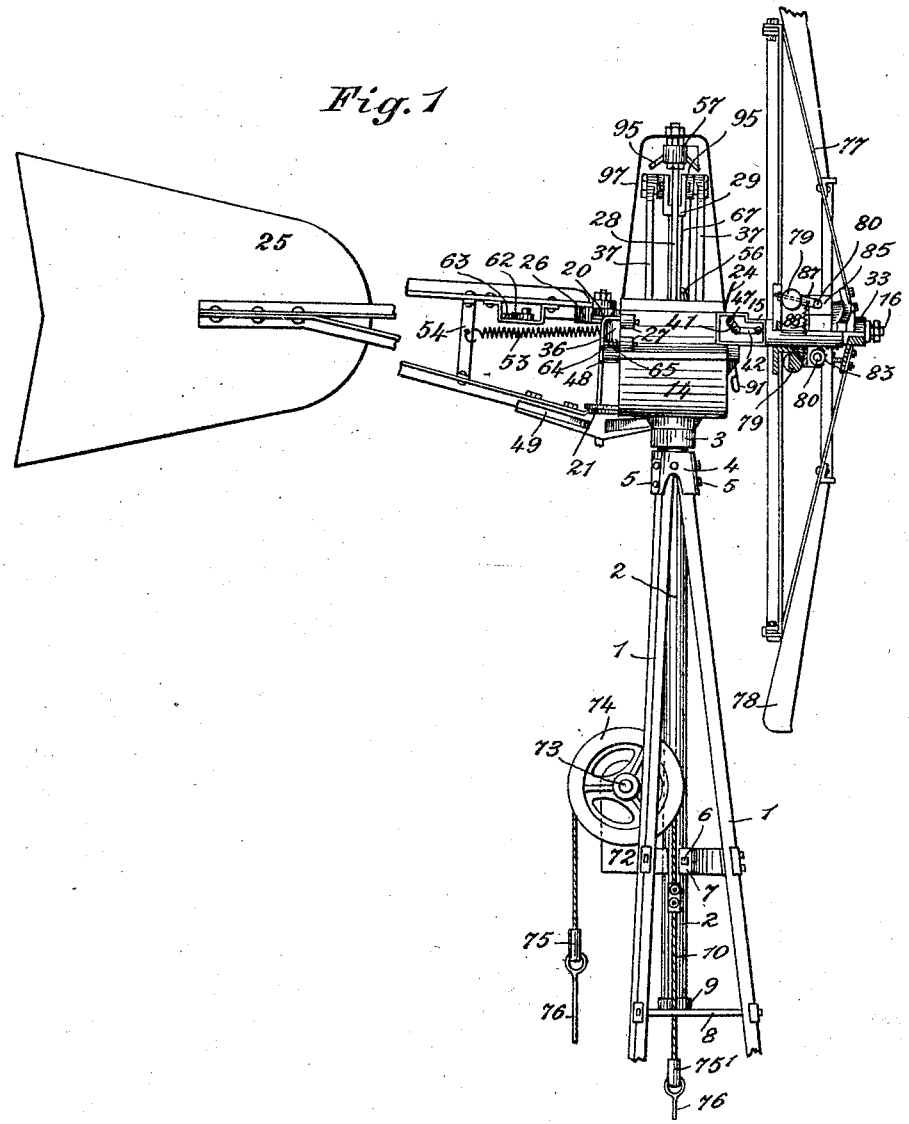

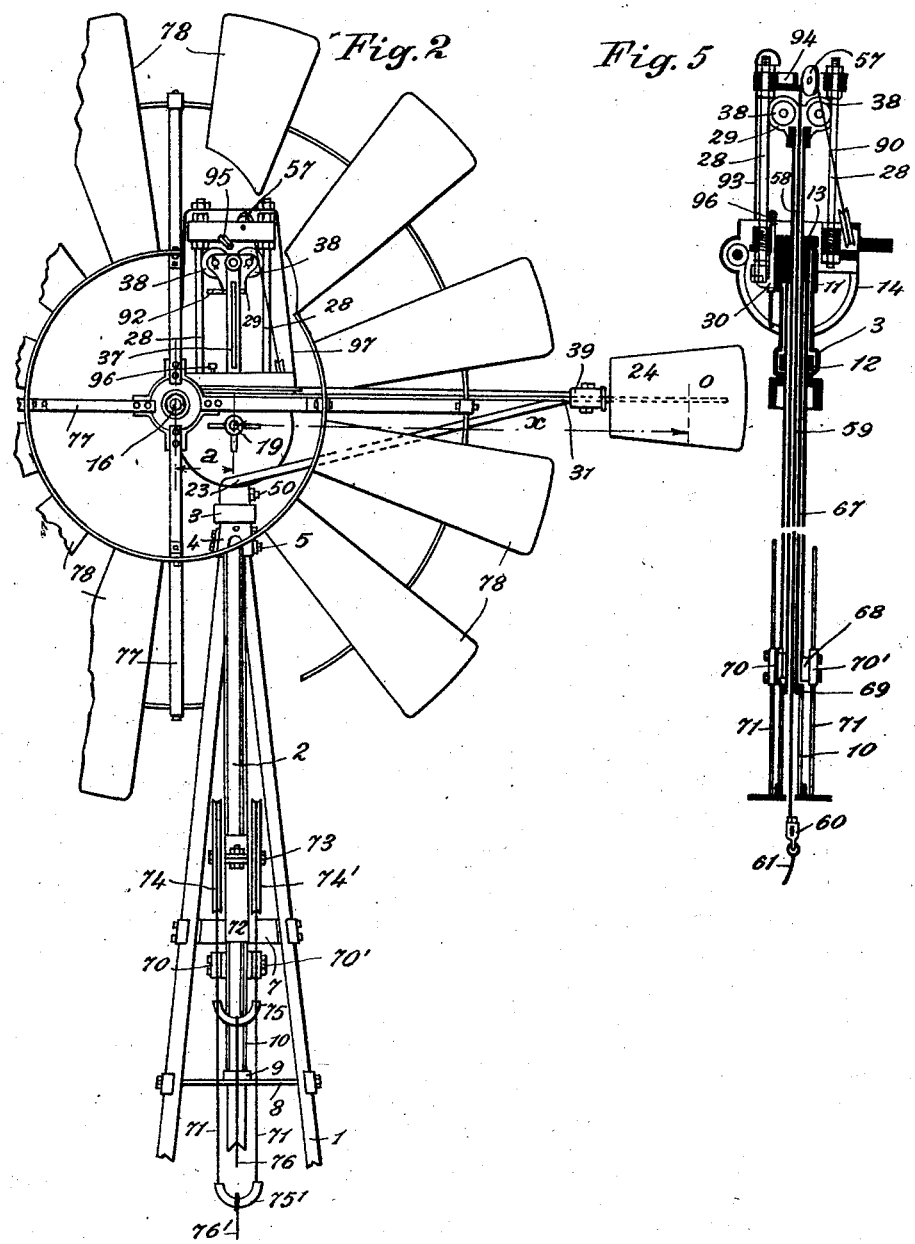

1,535,517

UNITED STATES PATENT OFFICE.

CORRADO ANDREINI, OF GROSSETO, ITALY.

WINDMILL.

Application filed May 24, 1923. Serial No. 641,218.

*To all whom it may concern:*

Be it known that I, CORRADO ANDREINI, mechanical engineer, a subject of the King of Italy, and residing at Grosseto, Italy, whose post office address is No. 2 Viale della Stazione, Grosseto, Italy, have invented certain new and useful Improvements in Windmills, of which the following is a specification.

This invention which relates to windmills, has for its principal object to provide an automatically governed windmill, the speed of which will be maintained between certain limits automatically regardless of the velocity of the wind. This is brought about by the use of a regulating rudder which maintains the wind-wheel positioned in the path of the wind according to the speed developed by the wheel. When the wind is blowing lightly, the regulating rudder maintains the plane of the wind-wheel at right angles to the direction in which the wind is blowing, but when the wind is blowing strongly, the regulating rudder holds the wind-wheel so that it will not receive the full force of the wind, thereby preventing it from being driven by the wind at an excessive speed.

In carrying out the object of the invention, the axis of the wind-wheel is mounted at one side of the vertical axis of the head upon which the wheel is mounted, so that when the wheel is brought into the wind by the steering rudder there will be a tendency for the head to rotate about its vertical axis. This, however, is neutralized by the regulating rudder which is carried by the head and is disposed on the opposite side of the vertical axis of the latter from the horizontal axis of the wheel. The regulating rudder is adjustably mounted and its position is controlled by a governor associated with the wind-wheel. Thus, whenever the wind-wheel starts to rotate at an excessive speed, the governor will change the position of the regulating rudder, causing the position of the head to be shifted with reference to the direction of the wind so that the wind-wheel will not receive the full force of the wind. As soon as the velocity of the wind decreases, the governor will change the adjustment of the regulating rudder, and thus again bring the wind-wheel directly into the wind so that its speed will not be materially lessened.

A more complete understanding of the invention will be understood by reference to the following detailed description taken in connection with the accompanying drawings.

In these drawings:—

Fig. 1 is a side elevation of a windmill constructed in accordance with the principles of the invention;

Fig. 2 is a front view of a portion of the windmill;

Fig. 3 is a plan view of a portion of the windmill, showing certain parts of the gear box removed;

Fig. 4 is an enlarged view, partly in side elevation and partly in longitudinal section of a portion of the hub of the wind-wheel, showing particularly the governor and means controlled by the governor for adjusting the position of the regulating rudder; and Fig. 5 is a diagrammatic vertical sectional view of a portion of the windmill tower and the head, showing particularly the arrangement of the cables for the transmission of power.

In the illustrated embodiment of the invention, the numeral 1 designates a plurality of angle iron members which are arranged to form the supporting tower of the windmill. These members have their upper extremities secured by bolts or screws 5 to a connecting member 4, while they are coupled together at intermediate points by tie-rods 6 and 7 and by a plate 8.

Supported by the connecting member 4, the tie-rods 6 and 7, and the plate 8 is an upright column or tube 2. The upper end of this tube 2 extends above the top of the connecting member 4 and forms a spindle upon which the head 14 of the windmill is rotatably mounted. It will thus be seen that the entire head carrying the wind-wheel, the steering rudder and the regulating rudder, to be hereinafter described, is mounted to rotate about the vertical axis formed by the upper end of the upright column 2.

The above-mentioned head 14 is in the form of a casing which is provided with a bearing 15 for the shaft or spindle 16 of the wind-wheel. This shaft 16 is of course positioned horizontally and is disposed at one side of the vertical axis about which the head 14 turns, as clearly illustrated in Figs. 2 and 3 of the drawings. One end of the shaft projects into the inside of the casing 14 where it is provided with pinions 17 engaging gears 18 which are loosely mounted upon their spindles 19. Connecting rods 37 connect the gears 18 from eccentric points to a block 29 which is slidably mounted in the head 14. In order to reduce the friction, this block 29 is provided with rollers 38 bearing against guide posts 28 fixedly carried by the head. The posts 28 and rollers 38 co-operate to permit the block 29 to have a vertical sliding movement with respect to the head 14.

The block 29 carries a depending tube 67 which extends through the column 2 and is provided at its lower end with projections 68, which extend through slots 10 in opposite walls of the tube 2. To these projections 68 are fastened cables 71. These cables 71 pass around pulleys 74 and 74' mounted upon the tower at the vicinity of the tie-rods 6 and 7. Two of the cables 71 are provided and these are coupled together at their ends by coupling members 75 and 75'. To the coupling members 75 and 75', rods 76 and 76' respectively are coupled. These rods extend downwardly to the bottom of the tower and are intended to be operatively connected to the pump or device which the windmill is designed to operate.

The wheel of the windmill which is fixed upon the shaft 16 has a plurality of fixed blades or vanes 78. These blades of course are pitched, so that when the wheel is brought into the wind, a rotary movement will be imparted thereto.

Extending laterally from the head 14 across the shaft 16 and the shaft 19 which crosses the vertical axis of the head, is a shaft 31. This shaft 31 is mounted at one end in the head 14 and at the other end in a sleeve 39 carried by an arm 23 so as to be capable of oscillating. At its outer end, it carries the regulating rudder 24. It is to be noted that the regulating rudder 24 is disposed on the opposite side of the vertical axis of the head 14 from the side on which the axis of the wind-wheel is located. Thus, when the wind-wheel is brought into the wind, the wind will tend to act upon the blades of the windwheel in such a manner as to rotate the head 14 about its axis. This, however, will not actually take place, as the wind at the same time is exerting pressure upon the regulating rudder 24, and such pressure acting in the opposite direction with reference to the axis of the head will, as hereinafter explained, counter-balance the pressure of the wind upon the wind-wheel.

Associated with the hub of the wind-wheel is a pair of swinging governor members 79. These are carried by arms which are pivoted to spindles 80 on opposite sides of the shaft 16. As the wheel rotates, the governors 79 move outwardly by centrifugal action against the action of their springs 88. Upon one of the spindles 80, there is fixed a quadrant 83, meshing with a rack 84 which is slidable about the hub of the wind-wheel. Thus, as the governors 79 swing outwardly, the quadrant 83 will be turned and the rack 84 will be slid. The rack 84 bears at one end against a member 44 which is slidably mounted along the hub of the wheel. This member 44 is coupled at 43 to a link 42, which in turn is coupled to an arm 41 extending laterally from one end 40 of the shaft 31. It will therefore be seen that when the rack 84 is slid or moved longitudinally by the governor 79, the shaft 31 will be turned, thereby adjusting the position of the regulating rudder 24.

In order to hold or maintain the wind-wheel and regulating rudder 24 into the wind, the head 14 also carries a steering rudder 25. This is mounted at the outer end of angle iron arms 49 which have their inner ends hingedly connected to the casing 14. Thus, the steering rudder 25 may be swung from its operative position as shown in Figs. 1 and 3 at right angles to the plane of the wind-wheel, to an inoperative position parallel to the plane of the wind-wheel. The means for moving the steering rudder 25 from inoperative to operative positions consists of a cable 59 which extends through the tube 67 over the pulley 57, and then down under a pulley 56 and across the casing 14 to a pulley 51 mounted in a box-like portion 26 of the casing. To the shaft of this pulley 51, there is a laterally extending arm 52, to the free end of which is fastened one end of a spring 53. The other end of this spring is connected to one of the arms 49 upon which the steering rudder 25 is secured. Thus, when the cable 59 is pulled downwardly at the bottom of the tower, the arm 52 will be swung to the position shown in Fig. 3, placing the spring 53 under sufficient tension to move the steering rudder from inoperative position to operative position. Before the steering rudder will move from inoperative position, the latch 62 carried by one of the arms 49 and normally engaging the detent 64, must be released. This latch is pivotally mounted between its ends to one of the arms 49 and one end is connected to one extremity of the cable 66, the other extremity of the latter being connected to the arm 52, so that initial movement of the arm 52 out of normal position pulls upon the cable 66 and releases the latch 62.

It is to be understood that the size and position of the wind-wheel and the regulating rudder 24 will be such that the regulating rudder will hold the wheel at right angles to the direction of the wind while the wheel is being rotated by the wind at a speed not above an excessive speed. By the use of certain well known equations, which are not deemed necessary to herein set forth, the parts of the machine may be given the proper size and position by those skilled in the art.

Assuming that the wind-wheel is rotating not above an excessive speed at right angles to the direction of the wind, and that the velocity of the wind increases, then the speed of the wind-wheel will increase. When its speed increases, the governor members 79 will move further outwardly by centrifugal force, and inasmuch as the regulating rudder 24 is operatively positioned with the governor members 79, the angle of the regulating rudder 24 with respect to the direction of the wind will be changed. The regulating rudder 24 will be more effectively brought into the wind, and this will result in a movement of the head 14 about its vertical axis. This movement of the head 14 will of course move the wind-wheel out of right angles to the direction of the wind, so that it will not receive the full force of the wind. A reduction in the speed of the wind-wheel will therefore result. This operation will be repeated every time the wind-wheel begins to rotate at an excessive speed. Of course, when the wind dies down, the regulating rudder will resume its normal position and cause the wind-wheel to resume its normal position and permit the latter to operate at right angles to the direction of the wind, so long as its speed does not become excessive.

Inasmuch as the steering rudder 25 is coupled to the arm 52 by means of a coiled spring 53, the steering rudder will trail directly behind the wind-wheel and keep parallel to the direction of the wind, even while the regulating rudder 24 is holding the wind-wheel at an angle other than a right angle to the direction of the wind.

From the foregoing description, taken in connection with the accompanying drawings, the construction, operation, use and advantages of the invention will be readily understood.

It is obvious that certain changes may be made without departing from the spirit and principle of the invention and without sacrificing any of the advantages thereof, so that it is to be understood that this may be done within the meaning and scope of the appended claims.

What is claimed is:

1. In a windmill, the combination of a supporting member, a head mounted on said member to rotate about a vertical axis, a wind-wheel mounted on said head to rotate about a horizontal axis, the axis of said wind-wheel being disposed on one side of the vertical axis of said head, a regulating rudder carried by said head on the opposite side of the vertical axis of the latter from the axis of said wind-wheel, said rudder being adjustable to vary the angle between the plane of the wind-wheel and the direction of the wind, means controlled by the speed of the wind-wheel for varying the adjustment of said rudder according to the speed of the wind-wheel, and a steering rudder carried by said head to hold said wind-wheel and said regulating rudder into the wind.

2. In a windmill, the combination of a supporting member, a head mounted on said member to rotate about a vertical axis, a wind-wheel mounted on said head to rotate about a horizontal axis, the axis of said wind-wheel being disposed on one side of the vertical axis of said head, a regulating rudder carried by said head on the opposite side of the vertical axis of the latter from the axis of said wind-wheel, said rudder being adjustable to vary the angle between the plane of the wind-wheel and the direction of the wind, a governor carried by the wind-wheel, means controlled by said governor for adjusting said regulating rudder, and a steering rudder carried by said head to hold said wind-wheel and said regulating rudder into the wind.

3. In a windmill, the combination of a supporting member, a head mounted on said member to rotate about a vertical axis, a wind-wheel mounted on said head to rotate about a horizontal axis, the axis of said wind-wheel being disposed on one side of the vertical axis of said head, a regulating rudder carried by said head on the opposite side of the vertical axis of the latter from the axis of said wind-wheel, said rudder being rotatable about a horizontal axis disposed at right angles to the horizontal axis of said wind-wheel, means controlled by the speed of the wind-wheel for adjusting the position of said rudder about its axis according to the speed of the wind-wheel, and a steering rudder carried by said head to hold said wind-wheel and said regulating rudder into the wind.

4. In a windmill, the combination of a supporting member, a head mounted on said member to rotate about a vertical axis, a wind-wheel mounted on said head to rotate about a horizontal axis, the axis of said wind-wheel being disposed on one side of the vertical axis of said head, a regulating rudder carried by said head on the opposite side of the vertical axis of the latter from the axis of said wind-wheel, said rudder being mounted to rotate about an axis disposed at right angles to the horizontal axis of said wind-wheel, a rack slidable along the hub of said wind-wheel, a centrifugal governor carried by said wind-wheel, a segment controlled by said governor and engaging said rack, connections between said rack and said rudder, and a steering rudder carried by said head to hold said wind-wheel and said regulating rudder into the wind.

In testimony whereof I have hereunto signed my name in the presence of two witnesses:

CORRADO ANDREINI.

Witnesses:
G. B. ZAUARDO,
ZEE CAMILLE PAREON.